United States Patent [19]

Scaramucci

[11] Patent Number: 5,000,223

[45] Date of Patent: Mar. 19, 1991

[54] SWING CHECK VALVE WITH SECURED CAGE

[76] Inventor: John P. Scaramucci, 10724 Woodridden, Oklahoma City, Okla. 73170

[21] Appl. No.: 430,435

[22] Filed: Nov. 1, 1989

Related U.S. Application Data

[62] Division of Ser. No. 286,979, Dec. 20, 1988.

[51] Int. Cl.$^5$ .............................................. F16K 15/03
[52] U.S. Cl. .................................. 137/527.8; 137/515.7
[58] Field of Search ........ 137/454.2, 515.7, 527–527.8

[56] References Cited

U.S. PATENT DOCUMENTS

| | | | |
|---|---|---|---|
| 3,933,173 | 1/1976 | Kajita | 137/527.8 |
| 3,937,441 | 2/1976 | Baumann | 137/527 X |
| 4,201,241 | 5/1980 | Schertler | 137/527 |
| 4,313,458 | 2/1982 | Burns | 137/527 |
| 4,586,534 | 5/1986 | McNeely | 137/527 X |
| 4,605,041 | 8/1986 | Teumer | 137/527 |

FOREIGN PATENT DOCUMENTS 2079406  1/1982  United Kingdom ............. 137/527.8

OTHER PUBLICATIONS

Publication, Gray Tool Company, Graycheck, no date given.

Primary Examiner—Robert G. Nilson
Attorney, Agent, or Firm—Dunlap, Codding, Peterson & Lee

[57] ABSTRACT

A swing check valve wherein the valve seat, cage and disc are in the form of a cartridge having an overall length substantially equal to the length of the valve body. The valve is for use between flanges where the flanges do not provide support to prevent movement of the cartridge upstream or downstream. The cartridge is held in place by cooperating shoulders and screws engaging the cartridge and the valve body.

2 Claims, 6 Drawing Sheets

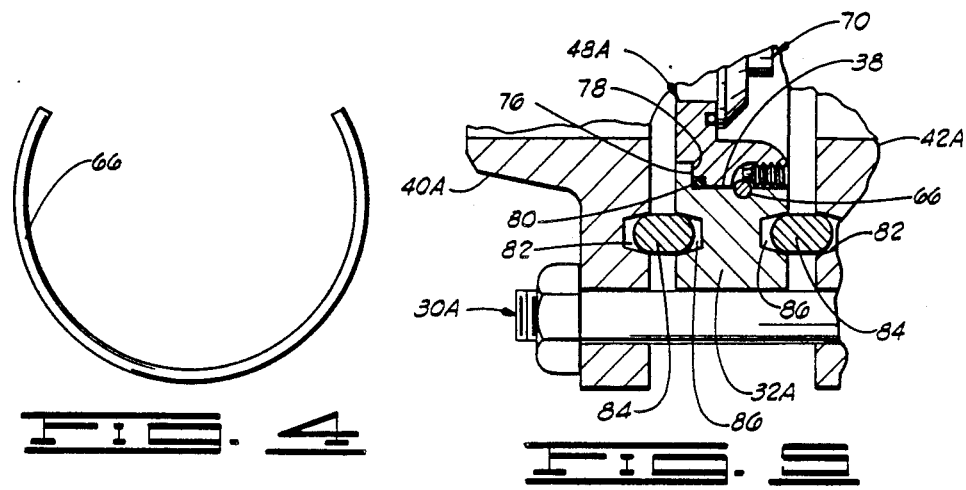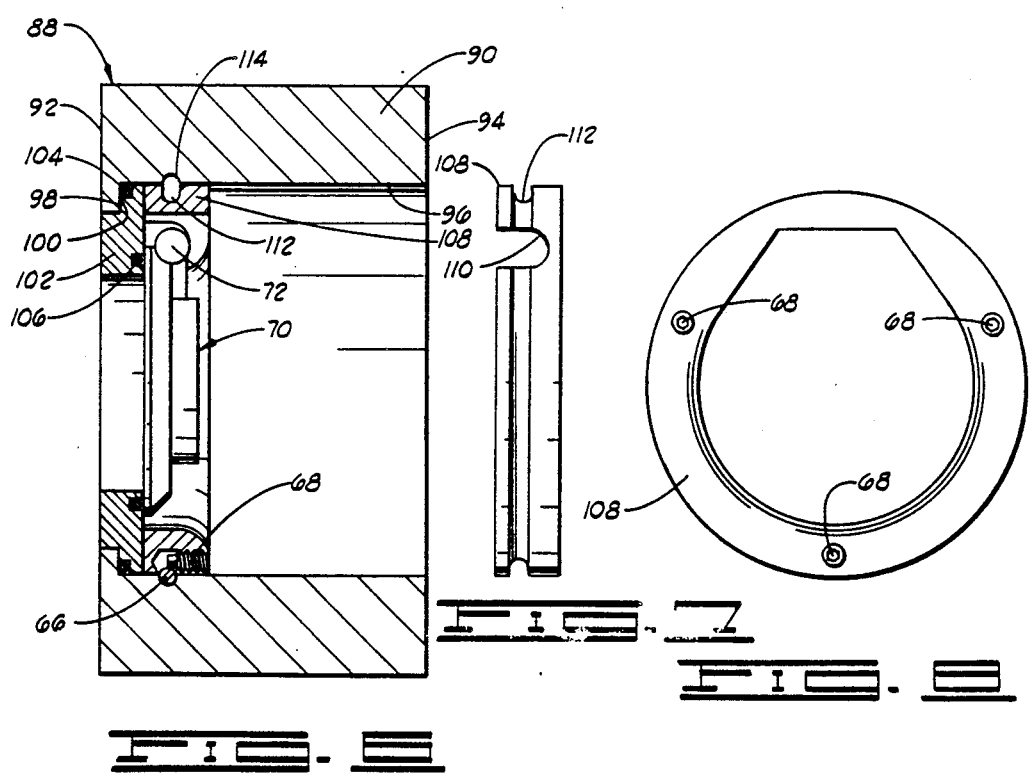

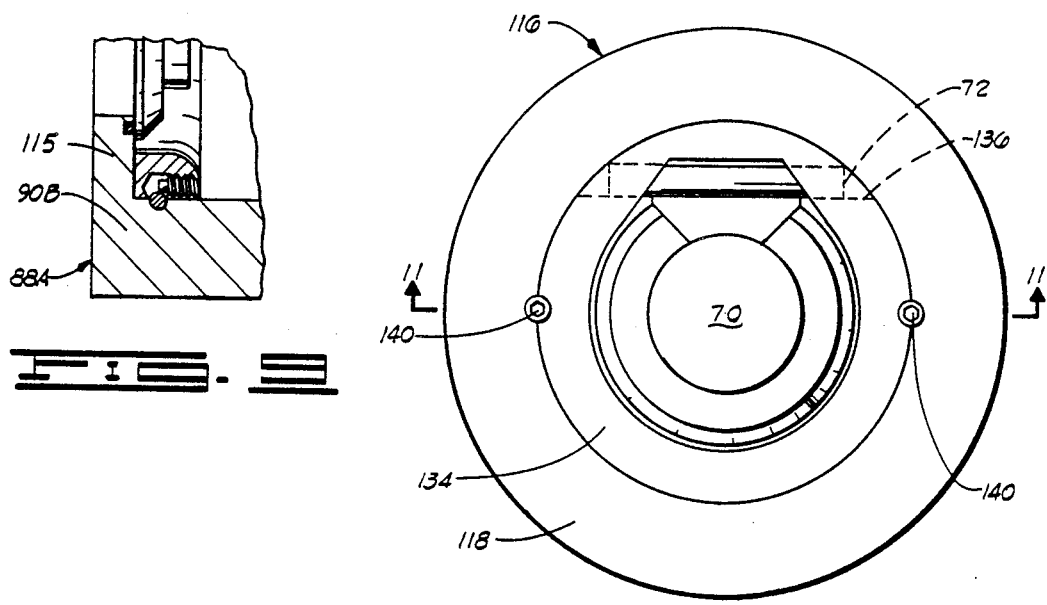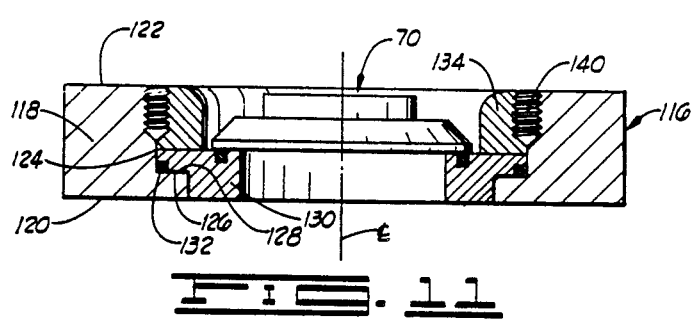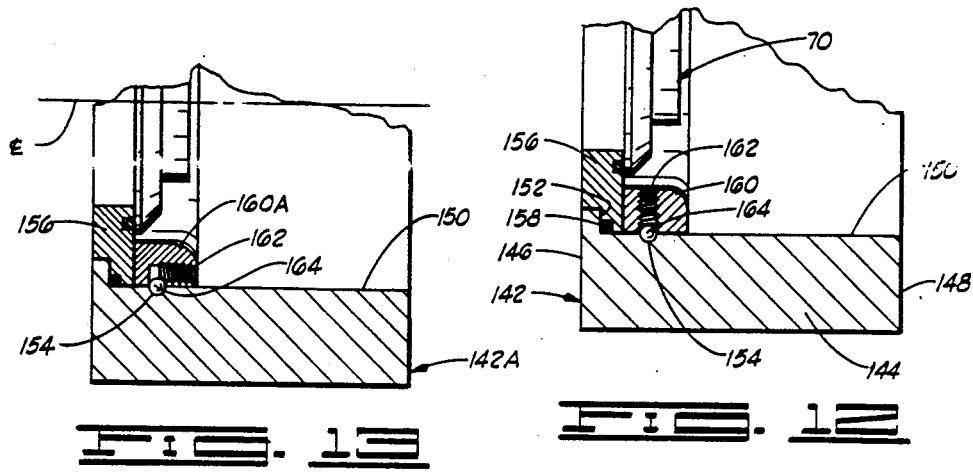

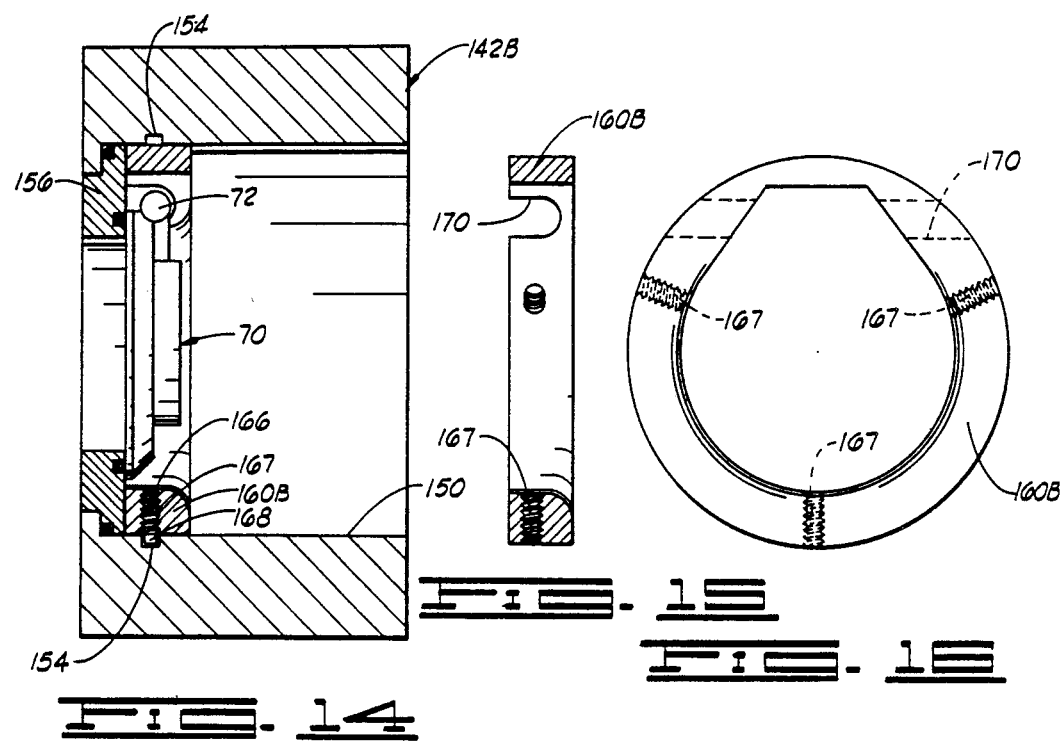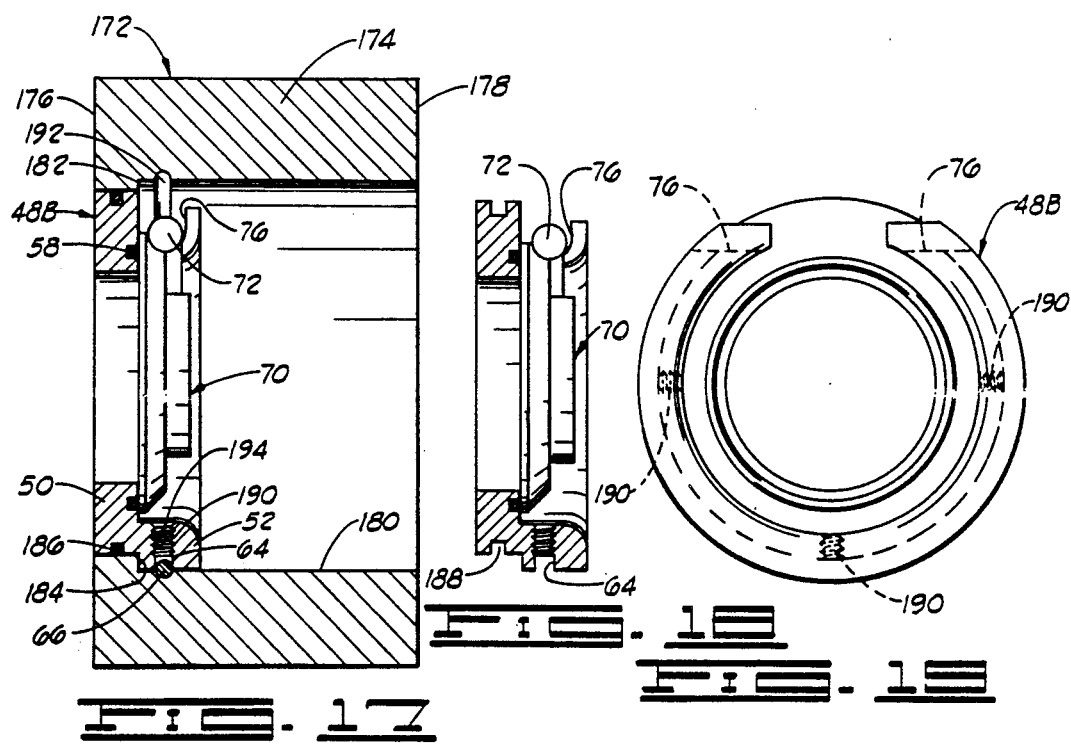

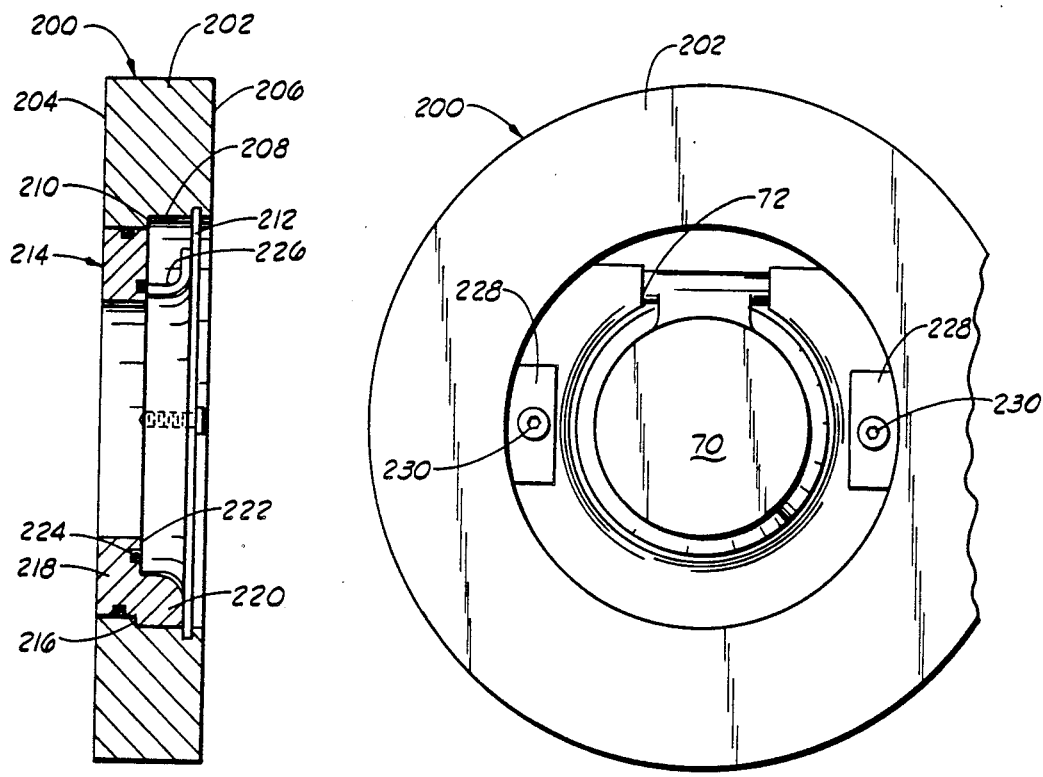
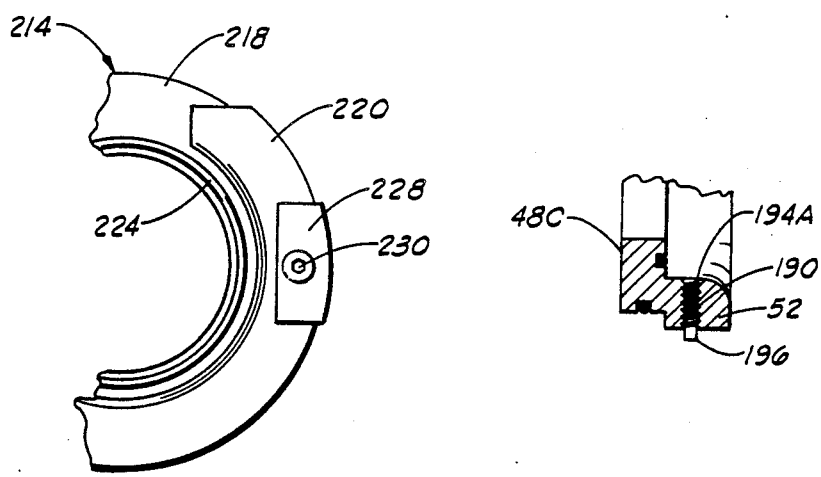

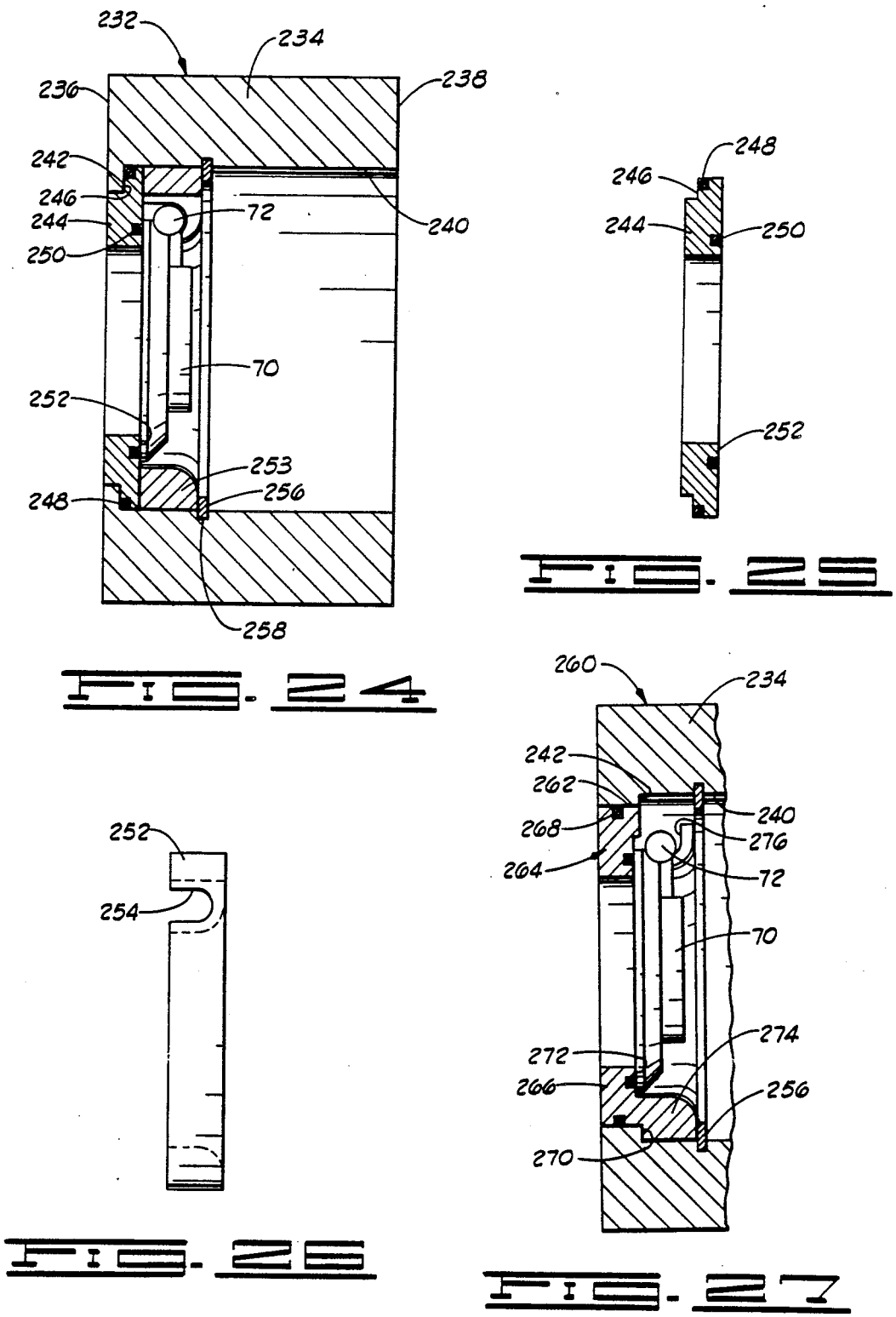

SWING CHECK VALVE WITH SECURED CAGE

This application is a division of Ser. No. 286,979, pending filed: Dec. 20, 1988, entitled SWING CHECK VALVE WITH SECURED CAGE.

CROSS REFERENCE TO RELATED APPLICATIONS

Related subject matter is disclosed in U.S. patent application Ser. No. 168,506, filed Mar. 15, 1988, entitled CHECK VALVE; now U.S. Pat. No. 4,809,735 U.S. patent application Ser. No. 168,507, filed Mar. 15, 1988, entitled, CHECK VALVE; now U.S. Pat. No. 4,809,741 U.S. patent application Ser. No. 049,383, filed May 13, 1987 entitled SWING CHECK VALVE, now U.S. Pat. Nos. 4,872,477; 4,872,478; 4,872,479 and 4,872,480 and a U.S. patent application entitled SWING CHECK VALVE WITH SECURED CARTRIDGE, filed on even dated herewith, now U.S. Pat. No. 4,852,603.

BRIEF SUMMARY OF THE INVENTION

1. Field of the Invention

This invention relates to swing check valves, and more particularly, but not by way limitation, to swing check valves adapted for use between flanges.

2. Background of the Invention

Historically, in between - flange swing check valves, sometimes known as wafer type valves, the seat and cage for supporting the disc have been retained in position against movement either upstream or downstream, or both, by the flanges at the ends of the valve; or, more correctly, by gaskets interposed between the ends of the valve body and the mating pipe flanges. Such an arrangement can be satisfactory if there is a gasket utilized for transmitting forces from the seat or cage to the adjacent pipe flange. However, if such a gasket is not available, such as in valves utilizing a spiral wound styled gasket, or a metal ring styled gasket, the flanges do not provide resistance against movement of the cage and seat either upstream or downstream.

The present invention provides various techniques for securing the cage, when the cage and seat are separate members, or the cage and seat when those members are integrally formed, directly to the valve body. Each technique prevents movement of the cage and seat either upstream or downstream in the valve body.

BRIEF DESCRIPTION OF THE DRAWINGS

FIG. 4 is an elevational view of a lock ring utilized in the valve of FIG. 1.

FIG. 5 is a partial cross-sectional view through a valve similar to the valve of FIG. 1.

FIG. 6 is a cross-sectional view through another form of valve constructed pursuant to this invention.

FIG. 7 is a side elevational view of the cage of the valve shown in FIG. 6.

FIG. 8 is an elevational view of the cage looking at the right side of the cage as shown FIG. 7.

FIG. 9 is a cross-sectional view through another valve constructed pursuant to this invention which is similar to the valve of FIG. 6.

FIG. 10 is an end elevational view of another form of valve.

FIG. 11 is a cross-sectional view taken along lines 11—11 FIG. 10.

FIG. 12 is a partial cross-sectional view through another form of valve.

FIG. 13 is a partial cross-sectional view through a form of valve similar to that shown in FIG. 12.

FIG. 14 is a cross-sectional view through another form of valve constructed pursuant to this invention.

FIG. 15 is a separate cross-sectional view through the cage of the valve shown in FIG. 14.

FIG. 16 is an end elevational view of the cage of the valve shown in FIG. 14 looking at the right hand side of the cage as shown both FIGS. 14 and 15.

FIG. 17 is a cross-sectional view through another form of valve constructed pursuant to this invention.

FIG. 18 is a separate vertical cross-sectional view taken through combination seat and cage shown in FIG. 17.

FIG. 19 is an end elevational view of the combination seat and cage shown in FIG. 18, with portions shown in phantom for clarity.

FIG. 20 is a cross-sectional view through a modification of the combination seat and cage shown in FIGS. 17-19.

FIG. 21 is a vertical cross-sectional view through another valve constructed pursuant to this invention.

FIG. 22 is an end view of the valve of FIG. 21 looking at the right-hand side of FIG. 21.

FIG. 23 is a partial end view of the combination seat and cage member of the valve of FIG. 21.

FIG. 24 is a vertical cross-sectional view of another valve.

FIG. 25 is a separate cross-sectional view of the seat of the valve of FIG. 24.

FIG. 26 is a side view of the cage of the valve of FIG. 24.

FIG. 27 is a vertical cross-sectional view of another valve.

DETAILED DESCRIPTION OF THE DRAWINGS

Figure 1:
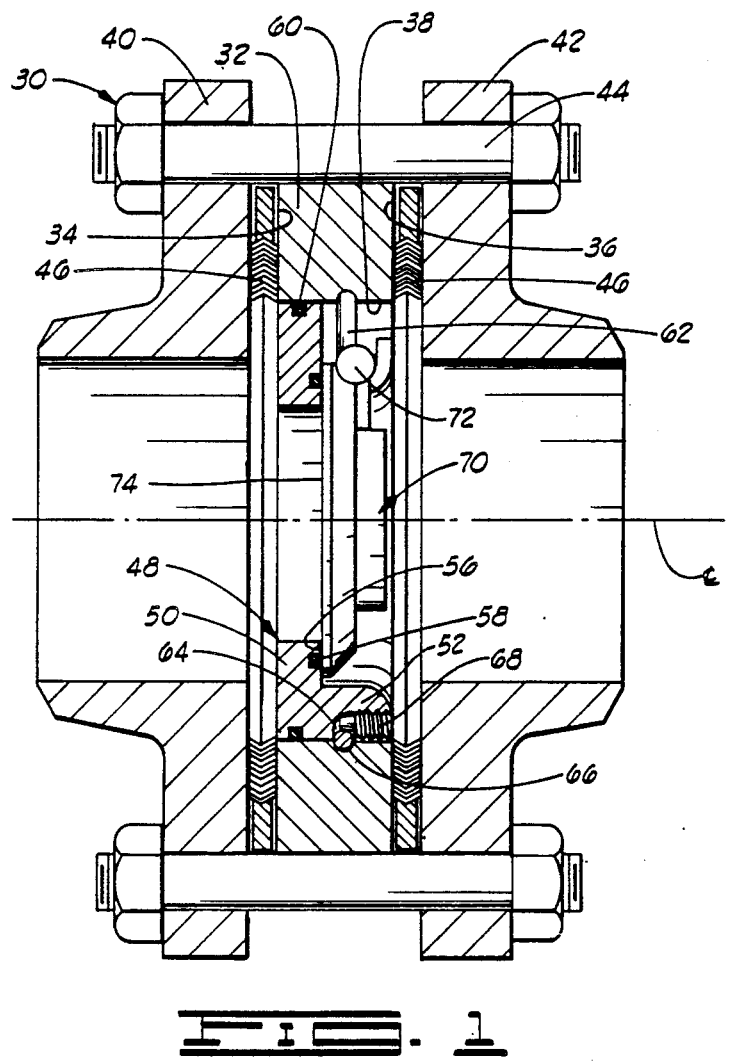
FIG. 1 is a cross-sectional view through a valve constructed pursuant to this invention.

Referring to the drawings in detail, and particularly FIG. 1, reference character 30 generally designates a valve constructed pursuant to this invention. The valve 30 comprises a valve body 32 having a planar upstream end 34 and a planar downstream end 36. A flow passageway 38 extends through the body 32 interconnecting the upstream and downstream ends 34 and 36.

The valve body 32 is positioned between mating pipe flanges 40 and 42 interconnected by bolts 44 in the usual fashion. A spiral wound style gasket 46 is interposed between each of the pipe flanges and the adjacent planar end of the valve body 32 to seal the valve body to the flanges. Each gasket 46 is typically sized such that the inner diameter thereof is greater than the diameter of the flow passageway 38 through the valve body 32.

A ring-like member, generally designated by reference character 48, is positioned in the valve body bore 38 and includes a valve seat portion 50 and a cage portion 52. The seat portion 50 has an annular seating face 56 facing downstream and containing a sealing ring 58. The cage portion 52 of the member 48 is in the form of the major portion of a ring surrounding the seating face 56. Also, the seating ring portion 50 of the member 48 has a sealing ring 60 mounted in a mating groove around the outer periphery thereof which sealingly engages the wall of the bore 38 of the valve body 32.

Figures 2, 3:
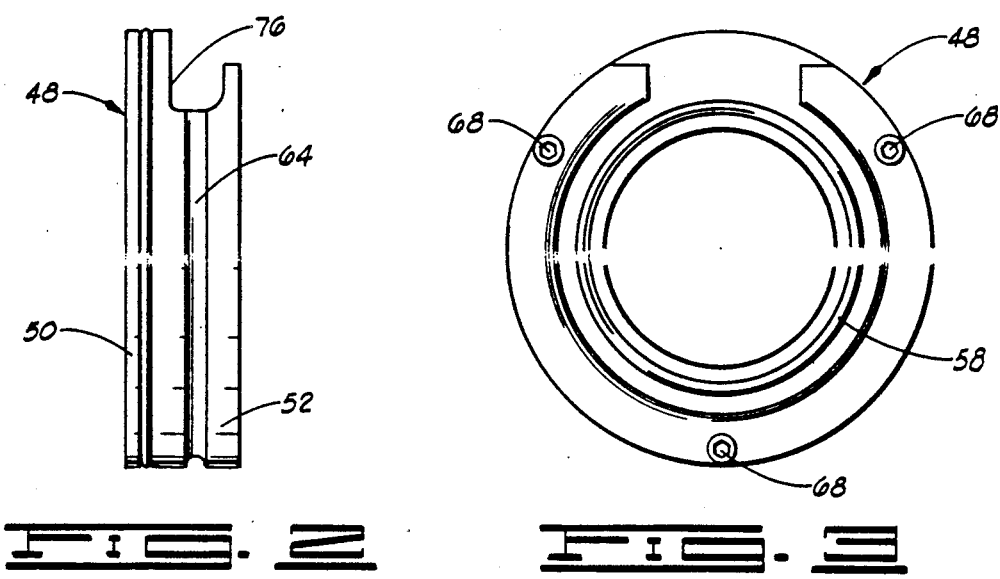
FIG. 2 is a separate side elevational view of the combined or integral seat and cage of the valve of FIG. 1.
FIG. 3 is an elevational view of the integral seat and cage looking at the right hand side of the seat and cage as shown in FIG. 2.

The wall of the bore 38 has an annular groove 62 therein and the outer periphery of the cage portion 52 has a mating groove 64 therein. A lock ring 66 is positioned in the annular groove 64 surrounding the cage 52 and, in its relaxed state, is completely contained within the groove 64. The groove 64 is clearly shown in the separate view of the member 48 shown in FIG. 2 and the lock ring 66 is shown separately in FIG. 4 for clarity of illustration. When the member 48 is properly positioned in the valve body 32, the lock ring 66 is urged radially outward, or expanded, partially into the surrounding groove 62 formed in the wall of the body bore 38. The lock ring is expanded by a plurality of set screws 68 shown in FIGS. 1 and 3. Each set screw 68 is threaded into the cage portion 52 parallel with the center line through the cage, and the inner end thereof is shaped, such as being tapered, to engage the lock ring 66 and expanded the lock ring as the set screw is threaded in position.

The member 48 is sized to extend substantially throughout the length of the valve body bore 38 and is held in operating position against both upstream and downstream movements by the lock ring 66 cooperating with the adjacent surfaces of the member 48 and the body 32, such that the member 48 is effectively connected to the body 32. As previously indicated, the lock ring 66 is held in operating position by the set screws 68. As a result, the gaskets 46 are not utilized to hold the member 48 in operating position.

The valve 30 also includes a valve disc 70 having a hinge pin 72 formed thereon. The axis of the hinge pin 72 is parallel with the seating face 74 of the disc 70 which mates with the seating face 56 of the valve seat portion 50. The opposite end portions of the hinge pin 72 are journaled in bearing surfaces 76 formed in the cage portion 52 With this arrangement, the disc 70 can swing about the axis of the hinge pin 72 between its closed position as shown in FIG. 1 counter clockwise to its open position, (not shown) which is substantially ninety degrees from the position shown in FIG. 1.

A slightly modified valve 30 A is partially shown in FIG. 5. In this valve construction, the wall 38 of the valve body 32A has an annular shoulder 76 therein facing downstream, and the member 48A, has a mating annular shoulder 78 around the outer periphery thereof, whereby the shoulders 76 and 78 prevent the movement of the member 48A upstream with respect to the valve body. Also, a suitable sealing ring 80 is carried in a mating groove in the shoulder 78 to mate with the shoulder 76 and provide a seal around the member 48A. The member 48A is held in the valve body bore against downstream movement by a lock ring 66 cooperating with grooves in the member 48A and the wall 38 in the manner previously described.

The modified pipe flanges 40A and 42A of the valve 30A shown in FIG. 5 are provided with grooves 82 in the seating faces thereof to contain metal ring styled gaskets 84. Each gasket 44 extends into a mating groove 86 in the adjacent end of the valve body 32A. The metal ring styled gaskets 84 provide an effective seal between the ends of the valve body and the adjacent pipe flanges, but do not provide any support for the working parts of valve positioned in the bore 38.

The valve 88 shown in FIG. 6 comprises a valve body 90 having planar upstream and downstream ends 92 and 94 for mounting of the valve between standard pipe flanges, but, for clarity of illustration, the pipe flanges are not shown. The valve body 90 has a bore 96 extending therethrough interconnecting the upstream and downstream ends 92 and 94, and is provided with an annular shoulder 98 therein facing downstream. The shoulder 98 mates with an upstream facing shoulder 100 formed on the outer periphery of a valve seat ring 102. Thus, mating shoulders 98 and 100 prevent upstream movement of the valve seat. A suitable sealing ring 104 is mounted in a mating groove in the shoulder 100 to prevent the leakage of fluid around the seat ring 102. Also, the seat ring 102 is provided with a seating ring 106 in the seating face thereof to mate with the seating face of a disc 70.

The valve 88 also includes a ring-shaped cage 108 in the body bore 96 abutting the downstream end of the seating ring 102 and which surrounds the seating face of the seat ring 102. As shown in FIGS. 6 and 7, the cage 108 has bearing slots 110 therein facing the valve seat 102 which contain the opposite end portions of the hinge pin 72, such that the disc 70 can pivot between its open and closed position.

The cage 108 is also provided with an annular groove 12 in the outer periphery thereof which mates with a matching groove 114 formed in the wall of the body bore 96. The groove 112 of the cage is sized to normally contain the locking ring 66 previously described. The locking ring 66 is urged outwardly to extend into portions of the mating grooves 112 and 114 by a plurality of set screws 68 arranged in the same manner as the set screws 68 of the valve of FIG. 1 previously described. Thus, the set screws 68, when fully seated, expand the locking ring 66 and the combination of the locking ring 68 and the mating grooves, connects the cage 108 to the valve body 90 to prevent downstream movement of the cage 108, as well as the seat ring 102.

The valve 88 of FIG. 6 may be modified to the configuration shown in FIG. 9 and indicated by reference character 88A. In the modified valve 88A, the valve body 90B is provided with an inwardly extending flange 115 to form a seat ring in lieu of the separate seat ring 102 shown in the valve of FIG. 6. With this modification, the valve 88A is the same as the valve 88.

FIGS. 10 and 11 illustrate a valve 116 which has a body 118 having upstream and downstream planar ends 120 and 122, whereby the valve can be placed between pipe flanges (not shown). A bore 124 extends through the body 118 interconnecting the upstream and downstream ends of the body. A downstream facing shoulder 126 is provided in the bore 124 to mate with a corresponding annular shoulder 128 formed on the outer periphery of a seat ring 130. The shoulders 126 and 128 cooperate to prevent the seat 130 and anything in contact therewith from moving upstream. A suitable seal 132 is held in a mating groove in the shoulder 128 to seal the seat ring 132 in the bore 124.

A ring-shaped cage 134 is positioned in the bore 124 in abutting contact with the downstream end of the seat ring 130. The cage 134 is provided with bearing grooves 136 therein facing the seat ring 130 to contain the opposite end portions of the hinge pin 72 of a disc 70, such that the disc 70 can be pivoted between open and closed positions.

The cage 134 is secured to the valve body 118 by a pair of set screws 140 secured into threads partially formed in the outer periphery of the cage and partially in the wall of the bore 124. Thus, the set screws 140 prevent the cage 134 and the seat ring 130 from moving upstream with respect to the body 118. It will be noted that the set screws 140 are extended on axes parallel with the center line of the cage.

The modified valve 142 partially shown in FIG. 12 includes a valve body 144 having planar upstream and downstream ends 146 and 148 for the fitting of the valve between pipe flanges. A bore 150 extends through the valve body 144 interconnecting the upstream and downstream ends 146 and 148. The wall of the bore 150 contains a downstream facing annular shoulder 152 adjacent the upstream end 146 and an annular groove 154 therein positioned a short distance downstream from the flange 152.

A seat ring 156 is positioned in the upstream end of the valve body 144 and is provided with an upstream facing annular shoulder 158 on the outer periphery thereof mating with the shoulder 152, such that the seat ring 156 is prevented from moving upstream in the body 144.

A ring-shaped cage 160 fits in the body bore 150 in abutting relationship with the downstream face of the seating ring 156 to support the disc 70 for swinging movement toward and away from the seat ring 156.

The cage 160 has at least one set screw 162 threaded therethrough in a direction transversely with respect to the center line of the cage in alignment with the annular groove 154 when the cage 160 is in operating position. The screw 162 is used to force a ball 164 into the groove 154 and anchor the cage 160 against downstream movement in the valve body.

A slightly modified valve 142A is illustrated in FIG. 13. In this modified structure, the set screw 162 is threaded into a mating threaded bore in the cage 160A, on an axis parallel with the center line of the cage in a position to engage the ball 164 and urge it into the groove 154 to secure the cage 160A to the valve body. In this regard it may also be noted that in the event a single set screw 162 and ball 164 are used in either of the embodiments 142 or 142A, then a single indentation may be provided in the body wall of the body bore 150 in lieu of a groove as previously described.

Another variation of the valve 142 is illustrated in FIG. 14 and is designated by reference character 142B. In this valve, a plurality of set screws 166 are threaded radially through the cage 160B and are of a size that the outer end 168 of each screw 166 can be extended into the annular groove 154 in the valve body bore 150. The threaded holes 167 through which the set screws 168 are extended are illustrated more clearly in FIG. 15 and 16 which illustrate a cross-section through and an end elevational view of the cage 160B. These views also illustrate bearing slots 170 in the cage 160B facing the seat ring 156 for receiving the opposite end portions of the hinge pin 72 of the disc 70 for pivotal movement of the disc between open and closed positions in the manner previously described.

Another modified valve 172 is illustrated in FIG. 17, 18 and 19. This valve comprises a valve body 174 having planar upstream and downstream ends 176 and 178. A bore 180 interconnects the upstream and downstream ends. The bore 180 is provided with an annular shoulder 182 therein facing downstream to mate with the upstream facing shoulder 184 of a modified combination seat and cage member 48B.

The combination seat and cage member 48B is modified in the provision of the shoulder 184 and in the use of a sealing ring 186 mounted in a cooperating groove 188 around the outer periphery of the seat portion 50 positioned to sealingly engage the smaller diameter portion of the valve body bore 180. The cage portion 52 of the member 48B has the hinge pin bearing areas 76 positioned to support the hinge pin 72 of the disc 70 in the same manner as before. However, in the modification, three tapped bores 190 are provided in equally spaced relation around the cage portion 52 extending radially outwardly through the cage portion in communication with the annular groove 64 surrounding the major portion of the cage portion 52. The groove 64 mates with a groove 192 formed in the wall of the valve body bore 180. A lock-ring 66 fits partially in the groove 64 and partially in the groove 192 to lock the member 48B from downstream movement in the valve body 174. The ring 66 is held in operating position by a set screw 194 threaded into each of the tapped bores 190. As before, when the set screws 194 are removed or retracted in the tapped bores 190, the ring 66 will contract completely into the annular groove 64 in order that the member 48B can be removed from the valve body.

A further, slightly modified combination cage and seat member 48C is partially illustrated in FIG. 20. In this modification, the member 48C does not have an annular groove in the outer periphery of the cage portion. Instead, the tapped bores 190 extend throughout the thickness of the cage portion 52 to receive a modified set screw 194A which is of sufficient length that when the set screw is fully seated in the respective bore 190, the outer end 196 of the respective set screw will be seated in the groove 192 of the valve body 174 to anchor the combination seat and cage member 48C in the valve body.

Another form of valve constructed pursuant to this invention is illustrated in FIGS. 21, 22, and 23 and generally designated by reference character 200. The valve 200 includes a valve body 202 having planar upstream and downstream ends 204 and 206, such that the valve 200 is adapted for installation between flanges. A bore 208 extends through the valve body 202 in communication with the upstream and downstream ends 204 and 206. The bore 208 is of two different diameters to provide a downstream facing annular shoulder 210 therein. Also, the bore 208 is provided with an annular groove 212 therein adjacent to downstream end 206 of the valve body.

A combination seat and cage member 214 fits in the valve body bore 208 and is provided with an annular shoulder 216 on the outer periphery thereof to engage the annular shoulder 210 in the valve body bore 208 and prevent downstream movement of the member 214 in the valve body. The number 214 provides a seat portion 218 and a cage portion 220. The seat portion 218 is provided with an annular seating face 222 thereon facing downstream, and a suitable sealing ring 224 is provided in a mating groove in the seating face 222. The seating face 222 is adapted to receive the seating area of a valve disc 70. The cage portion 220 surrounds a major portion of a seating area 222 and the free ends thereof are shaped to provide hinge pin bearing areas 226 to receive the opposite end portions of the hinge pin 72 of the valve disc 70. The disc 70 is not shown in FIG. 21 for clarity of illustration.

A pair of plates 228 are secured on the downstream end of the cage portion 220 by suitable screws 230. The plates 228 are diametrically opposed and are sized to extend into the valve body bore groove 212 to anchor the member 214 against downstream movement in the valve body 202. Each plate 228 is sized to be installed after the member 214 is positioned in the valve body 202.

The valve 232 shown in FIG. 24 utilizes a valve body 234 having planar upstream and downstream ends 236 and 238, such that the valve 232 is adapted for use between flanges. A bore 240 extends through the valve body 232 in communication with the upstream and downstream ends of the body. The diameter of the bore 240 adjacent the upstream end 236 of the valve body is reduce in diameter to provide an annular shoulder 242 facing downstream.

A ring-shaped valve seat 244 is positioned in the valve bore 240 and has an annular upstream facing shoulder 246 on the outer periphery thereof mating with the shoulder 242 in the valve body bore, such that the seat 244 is effectively secured to the valve body 234 against upstream movement in the event of a pressure reversal across the valve. An O-ring seal 248 is positioned in a mating groove in the valve seat 244 to mate with the body shoulder 242 and the walls of the bore 240 to prevent leakage of fluid around the valve seat. Another O-ring seal 250 is provided in the seating face 252 of the valve seat 244 to mate with the valve disc 70 when the valve disc is in a closed position.

A ring-shaped cage 253 is positioned in the valve body bore 240 against the downstream end of the valve seat 244 and surrounds the seating area 252 of the valve seat. The cage 253 has a pair of bearing slots 254 (see FIG. 26) positioned to receive the opposite end portions of the hinge pin 72 of the disc 70 for pivotally supporting the disc 70 in the valve. The valve seat 244 and cage 253 are prevented from downstream movement in the valve body 234 by a retainer ring 256 in the form of a snap-ring which fits in a mating groove 258 formed around the valve body bore 240.

The valve 260 shown in FIG. 27 utilizes a slight modification of the body 234 of the valve of FIG. 24. In the valve 260, the reduced diameter portion 262 of the valve body bore 240 is lengthened as compared with the reduced diameter portion of the bore 240 in the valve of FIG. 24.

A combination valve seat and cage 264 slightingly fits in the valve body bore 240 of the valve 260. The seat portion 266 of the member 264 is provided with an O-ring seal 268 in that portion of the outer periphery thereof which mates with the small diameter portion 262 of the valve body 240 to prevent the leakage of fluid around the member 264. A shoulder 270 on the outer periphery of the member 264 mates with the downstream facing shoulder 242 in the valve body to prevent the member 264 from moving upstream in the valve in the event of a pressure reversal across the valve. The seat portion 266 is also provided with a seal 272 in the seating face thereof to mate with the valve disc 70. The cage portion 274 of the member 264 surrounds the major portion of the disc 70 and the opposite end portions thereof are shaped into bearing areas 276 corresponding to the bearing area 76 previously described to receive the opposite end portions of the disc hinge pin 72. The downstream end of the member 264 abuts the snap-ring 256, such that the member 264 is prevented from moving downstream in the valve body 234.

Changes may be made in the combination and arrangement of parts or elements as heretofore set forth in the specifications and shown in the drawings without departing from the spirit and scope of the invention as defined in the following claims:

What is claimed is:

1. A swing check valve, comprising:
    a body having planar upstream and downstream ends and a bore therethrough interconnecting the upstream and downstream ends;
    a valve seat in the bore;
    a disc sized to mate with the seat;
    a removable ring-shaped cage in the bore supporting the disc for pivotal movement toward and away from the seat;
    means for securing the cage to the wall of said bore against upstream and downstream movement, said means including at least one set screw threaded into mating, partially threaded recesses in the outer periphery of the cage and the wall of said bore;
    wherein the seat is removable and the seat and cage are separate, abutting members; and
    wherein the seat and wall of said bore have mating annular shoulders, with the shoulder in the bore facing downstream.

2. A valve as defined in claim 1 characterized further to include a sealing ring carried by the seat sealingly engaging the shoulder in the bore.

* * * * *